United States Patent [19]

Kozelnicky

[11] Patent Number: 4,795,093

[45] Date of Patent: Jan. 3, 1989

[54] TRACTION/SANDING DEVICE FOR WHEELED VEHICLES

[76] Inventor: Edward D. Kozelnicky, P.O. Box 298, R.D. #2, Center Valley, Pa. 18034

[21] Appl. No.: 132,972

[22] Filed: Dec. 15, 1987

Related U.S. Application Data

[63] Continuation-in-part of Ser. No. 25,104, Mar. 12, 1987, abandoned.

[51] Int. Cl.⁴ .................. E01B 23/00; B60C 27/20
[52] U.S. Cl. ............................ 238/14; 206/216; 229/103
[58] Field of Search ............... 238/14; 291/1; 206/216, 206/335; 229/103

[56] References Cited

U.S. PATENT DOCUMENTS

| | | | |
|---|---|---|---|
| 1,004,861 | 10/1911 | Ek | 238/14 |
| 2,438,563 | 5/1946 | Kollmeyer | 238/14 |
| 3,350,013 | 10/1967 | Bergquist | 238/14 |
| 3,425,624 | 2/1969 | Jacobs | 238/14 |
| 3,640,459 | 2/1972 | Preisler | 238/14 |
| 3,708,117 | 1/1973 | Coale | 238/14 |
| 4,281,791 | 8/1981 | Schaaf et al. | 238/14 |
| 4,294,405 | 10/1981 | Ross | 238/14 |
| 4,361,277 | 11/1982 | Cannady et al. | 238/14 |
| 4,487,314 | 12/1984 | Stewart | 206/335 X |

Primary Examiner—Robert B. Reeves
Assistant Examiner—Scott H. Werny
Attorney, Agent, or Firm—Steele, Gould & Fried

[57] ABSTRACT

A traction/sanding device for a wheeled vehicle provides a traction strip attached at one narrow edge to an inflated, breakable container filled with an abrasive substance. The traction strip defines a package wrapping container which protects the container prior to use, preferably in the form of a cardboard box which is unfolded to extend the traction strip. In use, the strip is placed at the intersection of the tire and the road surface, gripper tabs towards the tire. Tire movement, even if spinning, draws the strip under the tire, pulling the container underneath until the weight of the vehicle breaks the container, spilling the abrasive substance on the ground to give an area of improved traction.

14 Claims, 2 Drawing Sheets

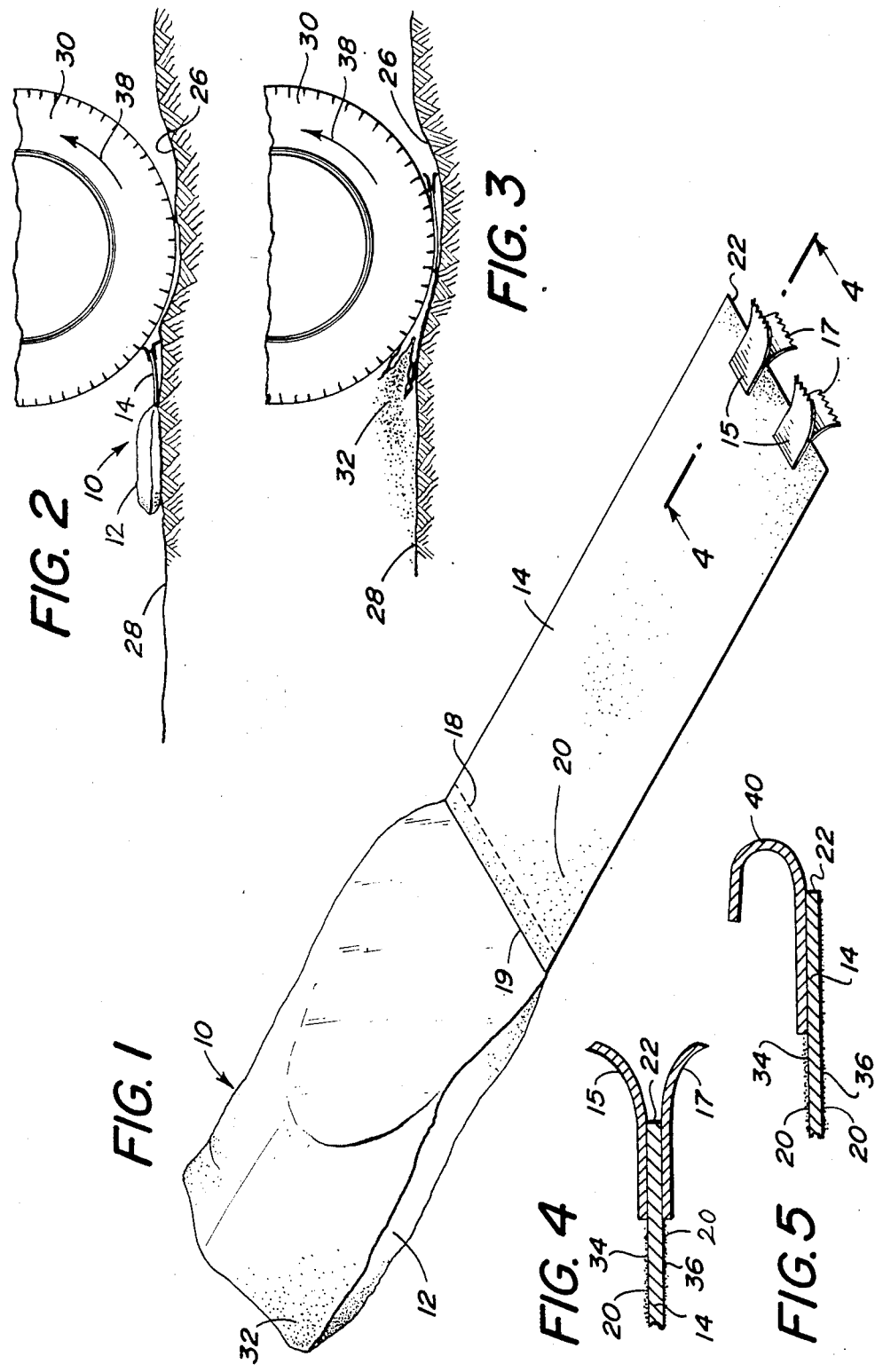

TRACTION/SANDING DEVICE FOR WHEELED VEHICLES

CROSS REFERENCE TO RELATED APPLICATION:

This is a continuation-in-part of copending application Ser. No. 25,104, filed Mar. 12, 1987, now abandoned.

BACKGROUND OF THE INVENTION

1. Field of the Invention

This invention relates to an automobile tire sanding device and more particularly to a device for applying abrasive materials under the driving wheels of motor vehicles to improve traction.

2. Background of the Prior Art

Drivers of motorized wheeled vehicles have long suffered from the problem of being unable to maneuver a vehicle in snow or ice or other surface which offers little traction. This problem is worsened when the vehicle is in a depression or on an incline. Through the years drivers have attempted to solve this problem by changing the road surface directly under the tire, such as by throwing sand underneath the wheel.

Many sanding devices for use with motorized wheeled vehicles are known, but most of them are complicated and involve permanent attachment to the vehicle. Nettles (U.S. Pat. No. 4,043,577) and Jones (U.S. Pat. No. 3,032,361) both disclose sanding devices in which a hopper, mounted to the outside of a vehicle, is operated by the driver. Hewitt (U.S. Pat. No. 3,889,991), Doud (U.S. Pat. No. 2,484,985) and Miller (U.S. Pat. No. 2,725,988) disclose sanding attachments in which hoppers are mounted interior of the vehicle and operated by the driver. All of these previous devices require mounting of apparatus on the vehicle.

Another type of device employs a burstable bag of abrasive or granular material and means to force the bag under the vehicle wheel. Kollmeyer (U.S. Pat. No. 2,438,563) has a protruding abrasive tab attached to a bag to be set against the wheel and drawn under the wheel. Aro (CAN 653,658 dated Dec. 11, 1962) is another example. A non-protruding tab is disclosed in Schaaf et al (U.S. Pat. No. 4,281,791).

A variety of sheet-like structures are also known for improving traction. Ross (U.S. Pat. No. 4,294,405) discloses a non-burstable bag. Cannady et al (U.S. Pat. No. 4,361,277), Preisler (U.S. Pat. No. 3,640,459), Bergquist (U.S. Pat. No. 3,350,013), Coale (U.S. Pat. No. 3,708,117) and Aro (CAN 715,939 dated Aug. 17, 1965) all disclose more-or-less flat track structures for improving traction. While integral traction-improving track structures can be easily stored, for example, by tossing them into the vehicle trunk, burstable bags are a storage problem. Contact with sharp objects and/or pressure will break the bags, spilling the enclosed sand, ash, salt and/or other material in the storage area. If moisture is then absorbed, the material may freeze as a solid block, rendering the bag unusable even though only small breaks may have occurred.

Any sheet-like structure extending from a burstable bag normally increases the exposure of the bag to accidental contacts and leakage. Although needed for pulling the bag under the wheel, the extending sheet itself is a source of accidental damage, especially if the sheet is made abrasive or is provided with sharp protrusions for better engaging a tire.

SUMMARY OF THE INVENTION

The aforemention prior art problems are obviated by the traction/sanding device of this invention. An elongated traction strip with narrow edges provides a tongue for a sealed container (e.g. a plastic bag filled with ash) and also defines a protective enclosure around the bag. The enclosure is unfolded when the bag is deployed. The strip can be coated on at least one side with an abrasive substance for good traction. The bag or other container is at least partially filled with a preferably granular abrasive substance, such as ash or sand, and is sealed. The container is preferably inflated when sealed to trap air or other gas inside. When the strip is unfolded and placed, preferably with an abrasive side facing upward, at the intersection of the tire and the ground, the tire movement over the strip pulls the container under the tire where it breaks the container and spills abrasive under the tire, thus providing an area of greater traction for the tire. Gripper tabs may be added to the other end of the traction strip to guide the strip onto the tire. Prior to use the container remains enclosed within the folded-up strip, safe from damage.

It is, therefore, an object of this invention to provide a traction/sanding device for wheeled vehicles which is inherently protected from damage during storage, by means of an arrangement of its parts. When opened, the device is easily placed under a tire and, when broken, spreads an abrasive substance around the ground under the tire. After use the remaining parts are easily folded up again and neatly discarded.

It is another object of this invention to provide a traction/sanding device which is easy and inexpensive to manufacture.

It is still another object of this invention to provide a traction/sanding device which can be used with any wheeled vehicle, is safely portable and easily transferred from one vehicle to another.

It is yet another object of this invention to provide a traction/sanding device which uses an inflatable, breakable container to hold the abrasive substance.

It is still a further object of this invention to provide a traction/sanding device which is disposable, but biodegradeable and non-harmful to the environment.

It is yet a further object of this invention to provide a traction/sanding device which enables a driver to move his car when the road surface does not provide enough traction, thus eliminating towing.

It is still a further object of this invention to provide a traction/sanding device which stores in a car for long periods at varying temperatures without damage to the device.

These and other objects will be more readily ascertainable to one skilled in the art from a consideration of the following Figures, description and exemplary embodiments.

BRIEF DESCRIPTION OF THE DRAWING(S)

FIG. 1 is an isometric view of the traction/sanding device of this invention including gripper tabs attached to the traction strip, the strip being elongated and rollable around the abrasive-material container.

FIG. 2 is a side view illustrating a tire in a depression of the roadway, the traction device of this invention placed at its intersection with the roadway.

FIG. 3 is the same view as FIG. 2 but illustrates the device of FIG. 2 broken and spilling abrasive substance on the roadway.

FIG. 4 is a cross section taken on lines 4—4 of FIG. 1 to show the attachment of gripper tabs to the traction strip.

FIG. 5 is a cross section of an alternative embodiment of the gripper tabs, the tabs J-shaped for spring tension.

DESCRIPTION OF THE PREFERRED EMBODIMENT(S)

Figure 6:
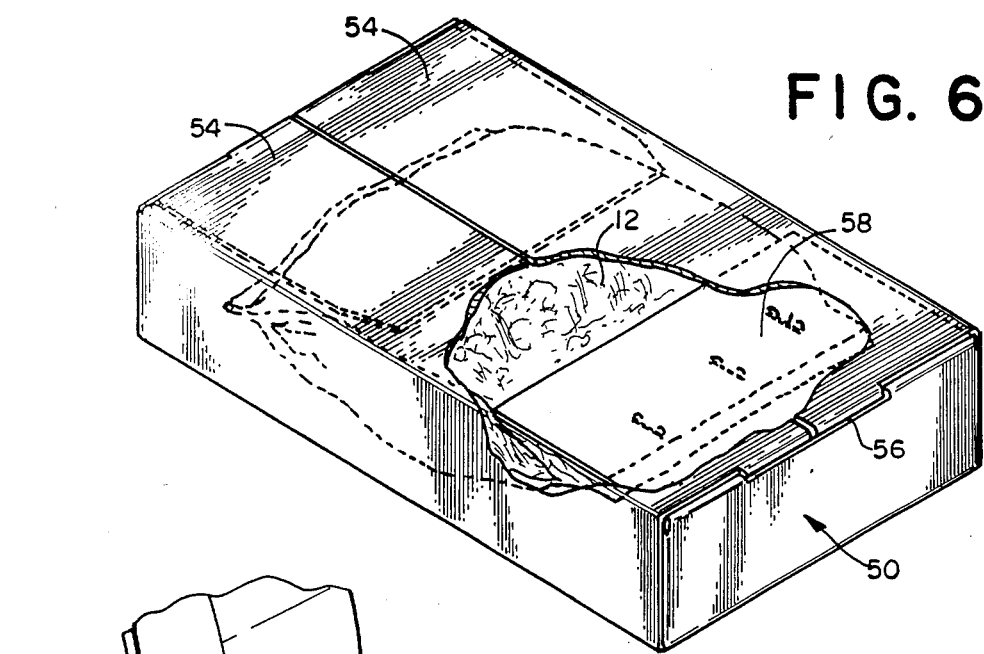
FIG. 6 is a partially cut away perspective view of an abrasive releasing device according to the invention, shown with the traction strip enclosing the container as a closed box.

Now referring to the Drawings, and more particularly to FIG. 1, traction/sanding device 10 is seen to include traction strip 14, container 12, and gripper tabs 15 and 17. It should be understood that although container 12 is pictured herein as a transparent bag, paper containers and containers of other shapes are possible. Container 12 holds abrasive substance 32, preferably ash and/or sand, and is partially inflated and then heat sealed to trap air or other gas inside. When used with larger vehicles, such as heavy trucks, it is preferred that the abrasive substance include mixtures of aggregates of larger sizes. Also seen inside container 12 is strip edge 19 which is sealed at edge 18 by a method such as heat sealing, which is well known in the art. At the other strip edge 22, gripper tabs 15 and 17 extend outward in finger-like projections. Grippers 15 and 17 are more fully explained in reference to FIG. 4.

Strip 14 can be coated with abrasive subtance 20 to provide traction to the strip. Abrasive 20 is preferably sand and may be applied by the manufacturer to either one or both sides of strip 14 by means of adhesive. Strip 14 can be made from sandpaper which, of course, is already coated with abrasive. Corrugated paper because of its uneven surface is also effective, even though uncoated. Now referring to FIGS. 2 and 3, tire 30 is seen lodged in depression 26 of roadway 28. In use, a driver places traction/sanding device 10 at the intersection of tire 30 and roadway 28 as shown. Strip 14, possibly via gripper tabs 15 and 17, is caught by tire 30, pulling strip 14 under tire 30 as the tire moves in the direction arrow 38. Even if the tire is only spinning, it draws strip 14 under tire 30 to a degree sufficient to pull container 12 under tire 30 to a point that the weight of the vehicle breaks the inflated container 12, thereupon spilling sand 32 onto roadway 28. The driver is now able to drive the vehicle out of depression 26 because of the increased traction provided by sand 32. Because traction device 10 is guided under tire 30 by strip 14 and gripper tabs 15 and 17, a driver need not force the device under the tire. Thus, the driver will not get dirty from using the device, nor will he need to stand out in the cold and wet trying to throw sand or the like under the tire. The sand is automatically spilled exactly where it is needed when container 12 breaks open.

Now referring to FIG. 4, a cross section shows the preferred embodiment of strip 14, having abrasive 20 on sides 34 and 36 and gripper tabs 15 and 17 affixed to sides 34 and 36 respectively at edge 22. Gripper tabs 15 and 17 are preferably a set of opposingly curved tabs which provide guidance to strip 14, no matter which side of strip 14 is placed upward under the tire. In this embodiment there are two sets of gripper tabs on strip end 22. Tabs 15 and 17 are preferably plastic and shaped to form an arch. When fastened by adhesive or staples, or the like, to opposite sides of strip 14, they arch in opposing directions. It is possible to have tabs 15 and 17 unitary, such as a Y-shaped tab. In such an application, the tab is fastened to only one side of strip 14 in such a manner that the opposing arches extend finger-like from end 22 of strip 14.

Now referring to FIG. 5, an alternative embodiment of the gripper tab is seen as J-shaped gripper tab 40 on strip side 34. As with gripper tabs 15 and 17, tab 40 may be used as a pair, one on each strip side 34 and 36. Gripper tab 40 has the advantage of spring tension because of the greater curve afforded by its J-shaping. This springiness allows it to more easily grip into the tread of a tire.

There are several variations which may be practiced within the scope of this invention. First, the traction strip may, or may not, be coated with abrasive, or it may simply be sandpaper or corrugated paper. Second, the type of abrasive stored in container 12 may vary, according to the type and size of the vehicle, although ash, cinders and/or sand are preferred for economic and environmental reasons. Third, the traction device can be manufactured in a variety of widths, each suitable to a different size vehicle tire.

While strip 14 is shown as a rectangle and sized to match the tire tread, this shape is not critical. Others could be substituted. Gripper tabs 15 and 17 may be eliminated, replaced with a differently shaped tab, or be used singly. When used in an opposed configuration, the unused gripper can be arranged to shear off.

Figure 7:
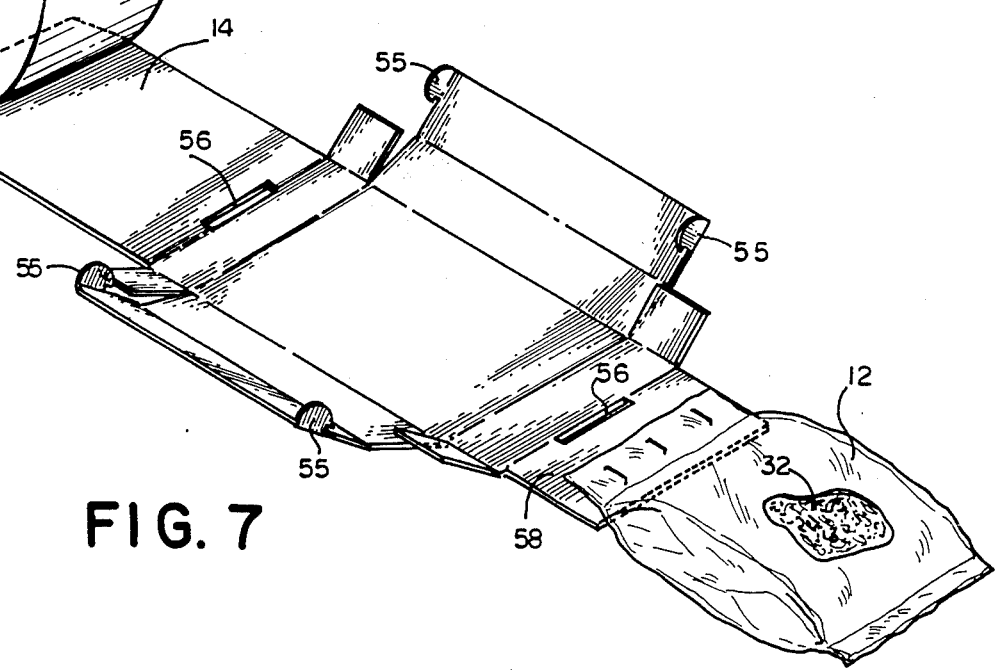
FIG. 7 is a partially cut away perspective view of the device of FIG. 6, unfolded and deployed.

As shown in the drawing, the strip 14 is long enough that it can be wrapped around container 12, whereupon container 12 is protected from punctures, for example from tabs 15, and 17. Another embodiment is shown in FIGS. 6 and 7, wherein strip 14 is continued to form a box 50 that can be folded around container 12. The box 50 may be made of cardboard, eg, corrugated craft paper sandwiched together with flat craft paper sheets. When closed, as in FIG. 6, the box 50 is neat and compact, container 12 being protectively enclosed. When opened, as in FIG. 7, the box 50 defines a substantially flat sheet for its end at tire 30 to an opposite end 58, to which container 12 is attached, for example with staples. Tire 30 pulls in container 12 via strip 14, body 52 and end tab 58, bursting container 12 when it meets tire 30.

The box 50 is foldable such that bag 12 rests on the body of the box, with strip 14 and sides 54 wrapping over bag 12 and end tab 58, affixed thereto. Slots 56 are provided on the upper surfaces, for receiving tabs 55 of sides 54 and locking box 50 closed. Tabs 55 preferably have cut-out inward-facing notches adjacent sides 54 to engage and lock in slots 56.

When the box is folded (FIG. 6), bag 12 cannot be punctured except through box 50. Box 50 defines a stable structure that will withstand some pressure, thereby preventing bursting due to pressure from outside. Bag 12 is also attached directly to tab 58, such that shaking box 50 can not cause bag 12 to burst against inner walls of box 50. Therefore, the bag remains whole and the sealed contents remain dry.

There are several advantages to the traction device of this invention. Chiefly, the device is easy to store and use and does not require attachment to the vehicle. It is easily adaptable to any vehicle and can easily be transferred from one vehicle to another. It provides excellent traction in exactly the area where the improved traction is needed. The traction/sanding device is safely stored in a vehicle for long periods at varying temperatures without damage to the device. Lastly, it is inexpensive to produce.

Having now illustrated and described my invention, it is not intended that such description limit this invention, but rather that this invention be limited only by reasonable interpretation of the appended claims.

What is claimed is:

1. A traction/sanding device for a motorized wheeled vehicle comprising an elongated generally rectangular traction strip to provide a tongue with parallel narrow edges, said strip being attached at one strip end along its width to a container, said container being a flexible bag, said strip defining a box for enclosing the bag, the strip having a longitudinal section extending along a path of the wheel when extended from the bag, and at least one transverse section, said longitudinal and transverse sections wrapping over the bag and over said end in a stored condition, said container partially filled with an abrasive substance, said container being sealed and a quantity of trapped gas being sealed with the abrasive substance therein, whereby when said strip is extended from the bag and placed with a second strip end at the intersection of the vehicle tire and the ground, tire movement over said strip and onto said container breaks said gag, spilling said abrasive substance on the ground under the tire, thereby producing an area of improved traction.

2. The traction/sanding device according to claim 1 wherein the longitudinal section and the transverse section are engageable together in the stored condition by interfitting tabs and slots.

3. The traction/sanding device according to claim 2 wherein the tabs are disposed on the transverse section and are engageable in slots on the longitudinal section.

4. The traction/sanding device according to claim 3 wherein the slots are substantially perpendicular to the path of the wheel.

5. The traction/sanding device according to claim 4 wherein the tabs have retention edges protruding around edges of the slots.

6. The traction/sanding device according to claim 1 wherein two transverse sections extend in opposite directions from the longitudinal section.

7. The traction/sanding device according to claim 1 wherein said abrasive substance is granular.

8. The traction/sanding device according to claim 1 wherein said container is a plastic bag and said abrasive is at least one of ash and sand.

9. The traction/sanding device according to claim 1 wherein said traction strip is coated on at least one side with an abrasive substance.

10. The traction/sanding device according to claim 1 including additionally at least one gripper tab attached to said second narrow strip edge to form a finger-like projection outward from said second edge, said gripper being generally arched to act as a guide.

11. The traction/sanding device according to claim 1 wherein said container and said strip are heat sealed together.

12. The traction/sanding device according to claim 1 wherein said strip is of a width predetermined to approximate that of a vehicle tire tread.

13. A traction/sanding device for a motorized wheeled vehicle comprising an elongated generally rectangular traction strip to provide a tongue with parallel narrow edges, said strip being attached at one strip end along its width to a container, said container being a flexible bag, said strip being part of a box enclosing the container, the box being folded from a sheet and having a body, two opposite ends, and sides, the container being a flexible bag fixed adjacent one of the ends of the sheet and an opposite end being protruding for placement under the wheel, said opposite end of the sheet being foldable over the bag and said sides being engageable over the ends to close the box over the bag, said container partially filled with an abrasive substance, said container being sealed and a quantity of trapped gas being sealed with the abrasive substance therein, whereby when said sheet is extended from the bag and placed with a sheet end at the intersection of the vehicle tire and the ground, tire movement over said sheet and onto said container breaks said bag, spilling said abrasive substance on the ground under the tire, thereby producing an area of improved traction.

14. A traction/sanding device for a motorized wheeled vehicle comprising:
(a) an elongated generally rectangular traction strip to provide a tongue of a width predetermined to approximate that of a vehicle tire tread, said strip being attached along its width at one narrow edge to a container and said strip being attached along its length at least on one side to means defining, with said strip, a box foldable around the container; and
(b) an inflated, breakable container partially filled with a granular abrasive substance and sealed so that a quantity of air is also sealed therein,
whereby when box is unfolded and the said strip is placed at the intersection of a vehicle tire and the ground, tire movement over said strip and onto said container breaks said container, spilling said granular substance on the ground under the tire to produce an area of improved traction.

* * * * *